Sept. 2, 1924.
A. J. BAZELEY
1,507,363
PIVOT PIN SUPPORT FOR CAR COUPLERS
Original Filed June 30, 1921
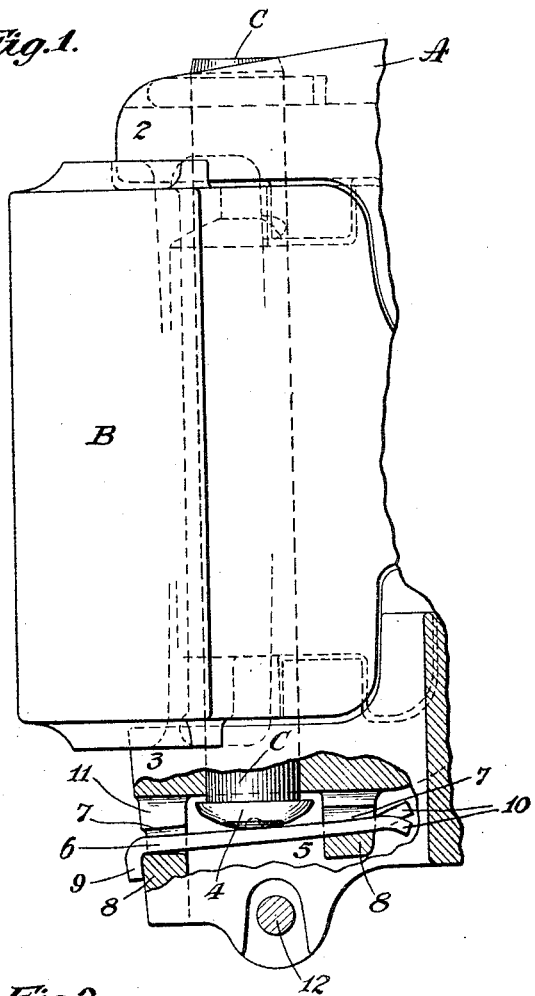
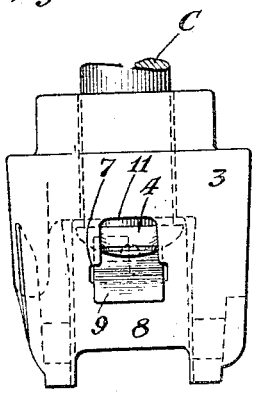
INVENTOR
Arthur J. Bazeley
BY Clarence D. Kerr
ATTORNEY Patented Sept. 2, 1924.

1,507,363

UNITED STATES PATENT OFFICE.

ARTHUR J. BAZELEY, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

PIVOT-PIN SUPPORT FOR CAR COUPLERS.

Original application filed June 30, 1921, Serial No. 481,468. Divided and this application filed March 15, 1923. Serial No. 625,356.

*To all whom it may concern:*

Be it known that I, ARTHUR J. BAZELEY, a citizen of the United States, residing at Cleveland, Cuyahoga County, Ohio, have invented new and useful Improvements in Pivot Pin Supports for Car Couplers, of which the following is a specification, reference being had to the accompanying drawings, in which—

Fig. 1 is a side elevation, partly in section, of a portion of a coupler having a pivot pin support embodying my invention; and Fig. 2 is a front elevation of the lower pivot lug or ear of the coupler head.

My invention relates to pivot pin supports for car couplers, and particularly for such car couplers in which it is important, because of the construction or use of the cars with which they are employed, that the pivot pin should be arranged to be insertable and removable from below, and with which means must be provided for supporting the pivot pin in the coupler. To this end I have provided a strong and efficient support in which the pin is upheld from below independently of lock actuating mechanism employed in couplers operated from the bottom. In addition to the foregoing my invention also comprises the construction and arrangement of the various features which I shall hereinafter describe and claim.

The present application is a division of my pending application, Serial No. 481,468, filed June 30, 1921.

Referring to the drawings, A indicates the coupler head having upper and lower ears 2 and 3, B the knuckle and C the pivot pin. The pivot pin C is insertable from below and is provided with a head 4, which when the pin is in position is supported in a recess 5 in the bottom side of the coupler ear 3 by means of a flat bolt 6. The bolt 6 is upheld by being passed through slots 7 in the webs 8, which depend from the ear 3. The ends 9 and 10 of the bolt may be suitably bent to prevent accidental removal or displacement from the slots 7. The slots 7 have a vertical extension 11 to permit access to and inspection of the lower end of the pivot pin when the bolt 6 is in position.

When the pivot pin C has been inserted through the pivot pin holes in the ears 2 and 3 and through the hub of the knuckle and the flat bolt 6 has been inserted through the slots 7 in the webs 8, the weight of the pin C is borne by the bolt 6, which is sufficiently robust to provide an effective support. This form of support for the pivot pin C does away with the necessity of supporting the pin on the axis or fulcrum 12 of a bottom operating locking and opening mechanism.

I have found that my invention provides a very useful way of supporting the pivot pin from below, which is convenient of access, not liable to breakage, and relieves the necessity of having the bottom operating lever used as a pivot pin support.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a car coupler having a head, a knuckle, a pivot pin, and ears on the head extending forwardly above and below the knuckle, the lower ear having a hollow lug at its base surrounding the lower end of said pivot pin, a flattened pin for supporting the pivot pin, said flattened pin extending through apertures in said ear, one of said apertures extending upwardly from said supporting pin to provide access to said pivot pin, and means for retaining said flattened pin in the apertures in said webs.

2. In a car coupler having a head with forwardly extending ears, a knuckle, a pivot pin insertable through said ears and knuckle from below, the lower ear having depending webs arranged to support a fulcrum for lock operating mechanism, the said webs being apertured above said fulcrum, a flat pin insertable through the apertured webs and adapted to support the pivot pin out of contact with said fulcrum, the flat pin having bendable portions for engagement with said webs to prevent dislodgment from the apertures in the webs.

ARTHUR J. BAZELEY.